United States Patent [19]

Lorents et al.

[11] Patent Number: 5,304,366
[45] Date of Patent: Apr. 19, 1994

[54] PROCESS AND APPARATUS FOR PRODUCING AND SEPARATING FULLERENES

[75] Inventors: Donald C. Lorents, Palo Alto; Ripudaman Malhotra, San Carlos, both of Calif.

[73] Assignee: SRI International, Menlo Park, Calif.

[21] Appl. No.: 814,721

[22] Filed: Dec. 24, 1991

[51] Int. Cl.$^5$ .......................... C01B 31/02; C09C 1/44
[52] U.S. Cl. ................................ 423/445 B; 422/152; 423/460
[58] Field of Search .................... 423/445, 445 B, 460, 423/449, 449.1, 449.2; 422/152

[56] References Cited

U.S. PATENT DOCUMENTS 4,542,007  9/1985  Murray ........................ 423/450

FOREIGN PATENT DOCUMENTS

PCT/US91/-
  05983  3/1992  PCT Int'l Appl.
PCT/US92/-
  04350  11/1992  PCT Int'l Appl.

OTHER PUBLICATIONS

Haufler et al., "Carbon Arc Generation of $C_{60}$", Mat. Res., Soc., Symp. Proc. vol 206, pp. 627–637, Nov. 29, 1990.
Johnson et al., "$C_{60}$ Has Icosahedral Symmetry", J. Am. Chem. Soc, vol. 112, pp. 8983–8984, Nov. 21, 1990.
Stoddart et al., "The Third Allotropic Form of Carbon" Agnew. Chem. Int. Ed. Eng, vol. 30, 1991, pp. 70–71.
Perry, Chemical Engineers Handbook, 3rd ed., pp. 660–665 (1950).
Ajie, Henry, et al., "Characterization of the Soluble All-Carbon Molecules $C_{60}$ and $C_{70}$", Journal of Physical Chemistry, vol. 94, No. 24, 60, pp. 8630–8633, Dec. 1990.
Bae, Y. K. et al., "Production, Characterization, and Deposition of Carbon Clusters", Document prepared for Symposium on Clusters and Cluster Assembled Materials Special Session on Buckminsterfullerene, Boston, Mass., Nov. 29, 1990, pp. 1–9.
Hare, J. P. et al., "Preparation and UV/Visible Spectra of fullerenes $C_{60}$ and $C_{70}$", Chemical Physics Letters, vol. 177, No. 4.5, Mar. 1, 1991, pp. 394–398.
Haufler, R. E., et al., "Efficient Production of $C_{60}$ (Buckminsterfulleren), $C_{60}H_{36}$, and the Solvated Buckide Ion", Journal of Physical Chemistry, vol. 94, No. 24., 1990, pp. 8634–8636.
Koch, A. S., et al., "Preparation of Fullerenes with a Simple Benchtop Reactor", Journal of Organic Chemistry, vol. 56, No. 14, 1991, pp. 4543–4545.
Kratschmer, W. et al., "Solid $C_{60}$: A New Form of Carbon", Nature, vol. 347, Sep. 27, 1990, pp. 354–357.

Primary Examiner—Wayne Langel
Assistant Examiner—Stephen G. Kalinchak
Attorney, Agent, or Firm—John P. Taylor

[57] ABSTRACT

A process and apparatus is described for the production of purified fullerenes using a non-reactive gas to collect and transport impure fullerenes from an evaporation zone to a heated filter zone in which solid impurities may be filtered out of the mixture. If one or more condensed fullerenes are present in the gas stream entering the filter zone, such condensed fullerenes may be vaporized in the filter zone and carried to a condensation zone in which one or more vaporized fullerenes may be recovered. When more than one vaporized fullerene is present in the gas entering either the filter zone or the condensation zone, a temperature gradient may be used to permit separation and recovery of purified portions of different fullerenes.

29 Claims, 2 Drawing Sheets

PROCESS AND APPARATUS FOR PRODUCING AND SEPARATING FULLERENES

BACKGROUND OF THE INVENTION

1. Field of the Invention

This invention relates to a process and apparatus for forming, recovering, and separating fullerenes. More particularly, this invention relates to a process and apparatus for making a mixture of impure fullerenes, transporting the mixture via a non-reactive gas to a heated filter zone, filtering out solid impurities from the vaporized fullerenes, thermally separating the fullerenes in the vapor phase, and then condensing and recovering the fullerenes.

2. Description of the Related Art

The formation of fullerene structures has been reported by the formation of soot from the evaporation of graphite electrodes in an evaporation chamber. The soot is scraped from the walls of the chamber and the fullerenes produced in the soot are separated from the remaining carbon forms therein by dissolving the fullerenes in a solvent such as benzene or toluene, and then separating this solution from the undissolved soot. The solvent is then evaporated to recover the fullerenes.

Such fullerene formation and recovery methods are described, for example, by Kratschmer et al. in "Solid $C_{60}$: A New Form of Carbon", published in Nature, Volume 247, pp 354–357, on Sep. 27, 1990; and by Y. K. Bae et al. in "Production, Characterization, and Deposition of Carbon Clusters", prepared for the Symposium on Clusters and Cluster Assembled Materials Special Session on Buckminsterfullerenes, in Boston, MA on Nov. 29, 1990, and published in The Proceedings of the 1990 Meeting of the MRS Society.

Such fullerenes, after formation and recovery by methods such as described above, are then separated from one another, if desired, i.e., purified, so that each may be independently used. Conventionally, such a separation is carried out using column chromatographic procedures.

However, while such techniques have been satisfactory for producing small quantities of fullerenes for experimental purposes, there remains a need for a process wherein larger quantities of fullerenes can be reliably produced, so that they may be utilized for commercial purposes such as, for example, in superconducting materials, in fullerene based chemicals, in polymers, etc.

SUMMARY OF THE INVENTION

It is, therefore, an object of this invention to provide a process and apparatus for producing, collecting, purifying, and recovering fullerenes.

It is another object of this invention to provide a process and apparatus for producing, collecting, purifying, and separating and recovering individual fullerenes.

It is yet another object of this invention to provide a process and apparatus for producing an impure mixture of fullerenes by evaporation of graphite, collecting the mixture in a heated flow of a non-reactive gas, purifying the fullerenes by separating them from entrained solids in the gas, and then recovering fullerenes from the gas by condensation.

It is a further object of this invention to provide a process and apparatus for producing an impure mixture of fullerenes by evaporation of graphite, collecting the mixture in a heated flow of a non-reactive gas, purifying the fullerenes in the heated gas by separating them from entrained solids in the gas in a heated filter means which is also capable of vaporizing one or more condensed fullerenes in the gas, and then separating and recovering individual fullerenes from the gas in a condensation zone.

These and other objects of the invention will be apparent from the following description and accompanying drawings.

DETAILED DESCRIPTION OF THE INVENTION

The process and apparatus of the invention provides for the production of purified fullerenes using a non-reactive gas to collect and transport impure fullerenes from an evaporation zone to a heated filter zone in which solid impurities may be filtered out of the mixture and one or more condensed fullerenes in the gas stream may be vaporized and carried to a condensation zone in which the vaporized fullerenes may be recovered. When more than one vaporized fullerene is present in the gas entering either the filter zone or the condensation zone, a temperature gradient may be used to permit separation and recovery of purified portions of different fullerenes.

Figure 2:
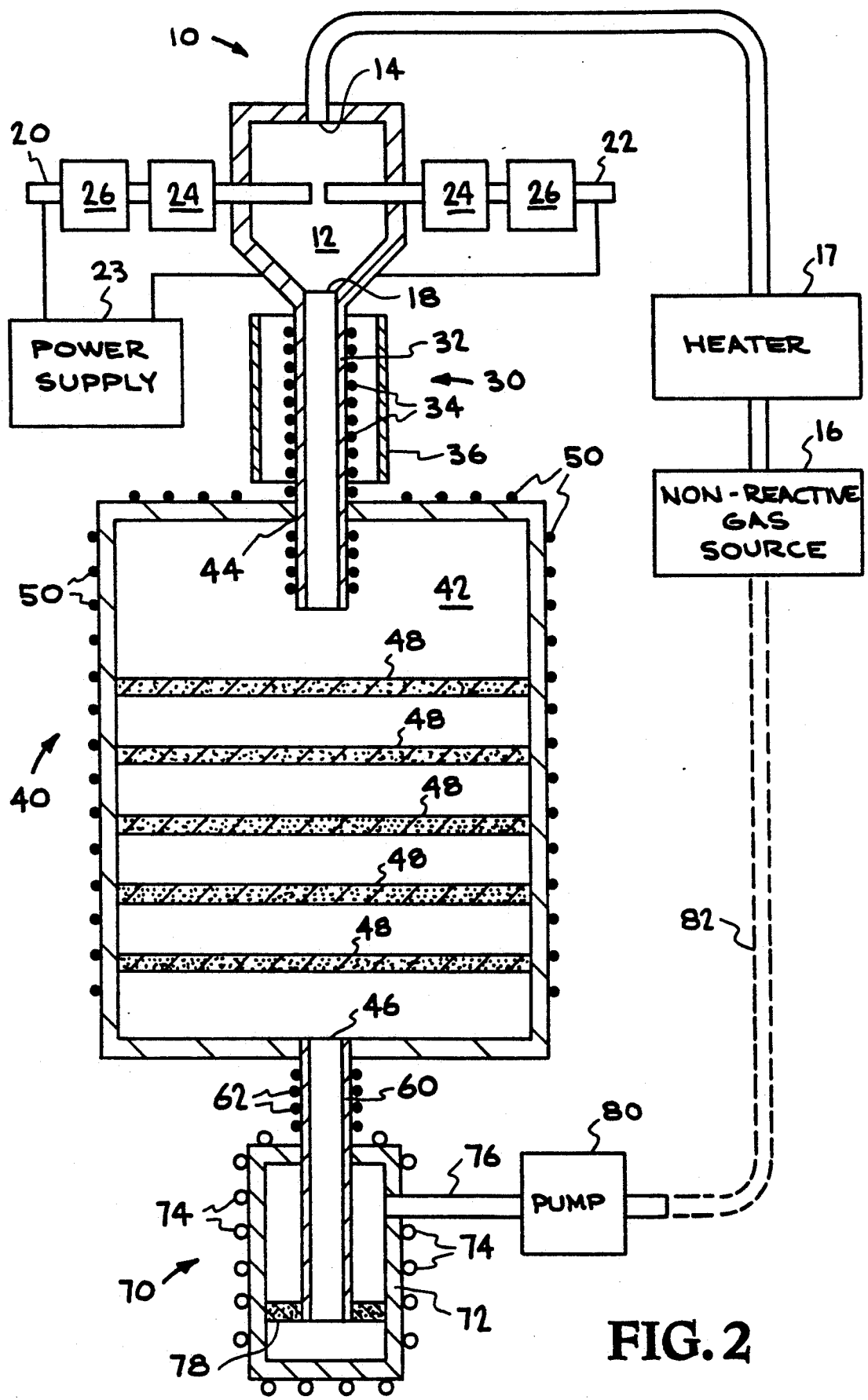
FIG. 2 is a vertical cross-sectional view of apparatus used in the practice of the invention.

Referring now to FIG. 2, the apparatus of the invention used in practicing the process of the invention is shown comprising, in general, an evaporation means 10, a filtering means 40, and a condensation and recovery means 70.

Evaporation means 10 comprises an evaporation chamber 12 containing two spaced apart and opposed graphite electrodes 20 and 22 which may be maintained at a distance or gap of from about 1 millimeter (mm) to about 10 mm apart. Electrodes 20 and 22 may be cooled by external water cooling means 24 surrounding the respective electrodes external of chamber 12 to control the temperature of electrodes 22 and 24 during the evaporation.

Electrode feed means 26 may be provided in connection with each electrode to slowly move or feed graphite electrode rods 20 and 22 inward toward one another at a rate approximately equal to the rate of consumption of rods 20 and 22 to maintain the gap between the rods. To avoid having to shut down the process to change rods, new rods may be bonded to the outer ends of graphite rods 20 and 22, for example, using technology well known in the aluminum smelting art to replenish the carbon electrodes used in the reduction reaction to produce aluminum.

In a typical arrangement, ¼" diameter graphite rods about 12" long are spaced apart in chamber 12 to provide a gap therebetween ranging from about 1 mm to about 5 mm, and an AC or DC arc is struck across the gap using a high current 20–30 volt power supply 23 with a current of from about 50 to about 200 amps flowing across the gap to vaporize or evaporate the graphite electrodes. When operated in this manner, the life of each electrode rod will usually extend from about 60 to about 90 minutes.

Evaporation chamber 12 may be constructed of any material which will be non-reactive with the materials being generated and entrained/vaporized in the gas flow through chamber 12. Preferably, chamber 12 is constructed of stainless steel.

Evaporation chamber 12 is provided with a gas entrance port 14 through which a non-reactive gas from an external gas source 16 enters chamber 12 to remove from chamber 12 the carbonaceous mixture of soot and fullerenes produced as graphite electrodes 20 and 22 evaporate.

The non-reactive gas used to sweep the impure mixture of fullerenes from chamber 12 may comprise any gas which will be non-reactive with any of the materials contained in the impure fullerene mixture being generated in chamber 12. This includes inert gases such as helium, neon, argon, krypton, xenon, as well as other non-reactive gases such as nitrogen. Inert gases such as helium and argon are preferred for this purpose.

The non-reactive gases entering chamber 12 may be heated solely by the heat generated by the arc established between electrodes 20 and 22 in chamber 12. Preferably, however, the gases are preheated in heater 17 up to a temperature of at least 500° C., and preferably within a range of from about 500° C. to about 1200° C. before entering chamber 12 to evaporate or vaporize any fullerenes being produced by the carbon evaporation and condensing reactions occurring in chamber 12 where the fullerenes are being formed. That is, the preheated gas may be used to anneal the newly forming fullerenes and to vaporize any fullerenes (such as higher molecular weight fullerenes) which may have condensed on solid impurities such as soot which may act as nucleation sites for such condensation.

The volume of the flow of gases through chamber 12 will depend, at least in part, upon the volume of chamber 12. For example, for a 1 liter evaporation chamber, the flow of gas through chamber 12 should range from about 1 standard cubic centimeter per minute (sccm) to about 100 sccm.

The gaseous mixture of entrained solid particles as well as vaporized fullerenes are swept out of chamber 12 through an exit port 18 into a heated conduit 30. Heated conduit 30 comprises an inner tube 32, through which the heated gases flow to filter means 40; a heater coil 34 in thermal contact with the outer surface of tube 32; and an outer heat shield 36. Inner tube 32 has an inner diameter which may range from about 2 cm to about 5 cm, depending upon the volume of chamber 12.

The purpose of heated conduit 30 is to provide for passage of the gas, including vaporized fullerenes and entrained solids, to filter zone 40 without any premature condensation of the fullerene vapors on the inner surface of tube 32.

Inner tube 32 of conduit 30 may be constructed of any non-reactive material such as quartz or any metal which will be non-reactive with the heated gases flowing through conduit 30. Preferably, tube 32 is constructed of stainless steel.

Heater coil 34 may comprise an electrical resistance heater or a tubular coil through which a heated liquid flows. Heater coil 34 should be capable of maintaining the walls of inner tube 32 at a temperature of at least about 700° C., and preferably within a range of from about 750° C. to about 1000° C., to prevent such premature condensation of vaporized fullerenes on the inner surface of tube 32.

Heat shield 36 may be formed of any material which will suitably reflect back the heat being radiated from tube 32 and thereby reduce the power needed to maintain the temperature within tube 32. Preferably, heat shield 36 is constructed of stainless steel. Insulation (not shown) may be placed in the space between heat shield 36 and inner tube 32, if desired, to further conserve heat. A tube furnace, having a suitable non-reactive (e.g., stainless steel) tube therein, could be used for this portion of the apparatus.

The heated gas, containing entrained solid impurities, such as soot, and vaporized fullerenes, passes through heated conduit 30 into filter means 40 which comprises a large heated filter chamber 42 which may comprise a cylinder and which has an upper entrance port 44 through which the heated gases pass into filter chamber 42. Filter chamber 42 is provided with a plurality of filter means, which in the illustrated embodiment are showed as circular discs or plates 48, through which the gases pass while solid impurities, such as soot, are trapped on the filter surfaces. The filtered gases then flow through an exit port 46 in the bottom of filter chamber 42 into the condensation zone 70.

Filter discs 48 may comprise any porous material which is non-reactive with the fullerenes in the gaseous mixture passing through the filter. Filter discs 48 should have an average pore size ranging from about 0.2 microns to about 10 microns to permit any solids having an average diameter larger than about 1 micron to be trapped or filtered out by filter discs 48.

When a plurality of filter discs 48 are utilized, as shown in FIG. 2, it may be desirable to grade the pore size of the filters, for example, to provide a coarse filter, followed by a medium filter and then a fine filter. In such instances, the porosity of the coarse filter may range from about 10 microns to about 20 microns, the porosity of the medium filter should range from about 1 micron to about 2 microns, and the porosity of the fine filter should range from about 0.2 microns to about 0.5 microns.

In accordance with the invention, filter means 40 are maintained at an elevated temperature by the provision of heating coils 50 around the outer surface of the sides of filter chamber 42 and, as shown in FIG. 2, preferably also on the outer surface of the top of chamber 42. It will be further noted in this regard, that to prevent premature condensation of the fullerenes in the gas stream entering filter zone 40 through conduit 30, inner tube 32 and a portion of heater coil 34 thereon extend a short distance into filter chamber 42.

Heating coils 50, in one embodiment, provide sufficient heat to filter chamber 42 to vaporize any fullerenes which may not already be in a gaseous state so that only solid impurities, such as soot, will be trapped and removed by filter discs 48. When filter means 40 are operated in this mode, heater coils 50 maintain filter chamber 42 at a temperature ranging from about 700° C. to about 1000° C.

In another embodiment, when it is desired to produce only a particular fullerene or group of fullerenes, the temperature may be set to condense all fullerenes having a higher molecular weight than the fullerene or group of fullerenes desired. In this manner, filter means 40 will partially purify the final product, with respect to fullerenes having a lower vapor pressure than the fullerene or fullerenes to be recovered. Only the vaporized fullerene or fullerenes will then pass through filter discs 48 and on to the condensation zone 70. Thus, for example, if it is desired to only recover the $C_{60}$ fullerene, the temperature in filter zone 40 is maintained at from about 425° C. to about 475° C. so that all other (higher molecular weight) fullerenes will condense and be trapped in filter means 40.

When operating in this mode, it is possible to also collect different molecular weight fullerenes by first operating filter means 40 at a low enough temperature so that only the lowest molecular weight fullerene will remain in a vapor state and then, after collecting and recovering this fullerene in the condensation zone, shutting off the arc between the electrode, while maintaining the gas flow. If the temperature in filter zone 40 is then raised sufficiently to vaporize the next higher molecular weight fullerene, it may also be condensed and recovered in the condensation zone. This procedure may then be repeated until all of the fullerenes initially condensed in filter zone 40 have been independently recovered, following which production may be resumed.

In yet another embodiment, heater coils 50 may be used to establish a temperature gradient in filter chamber 42 with, for example, the top portion of filter chamber 42 maintained at 700° C. and the bottom portion at 500° C., with the intermediate portion maintained at about 600° C. to establish a temperature gradient along the walls of filter chamber 42 where, for example, $C_{70}$ fullerenes will condense on the walls of filter chamber 42 adjacent the top thereof, while $C_{60}$ fullerenes will condense on the walls of chamber 42 adjacent the bottom thereof.

In any of the above embodiments, the filtered gases and uncondensed fullerenes exit filter means 40 via exit port 46 and then pass into condensation zone 70 via tube 60. Tube 60 preferably is also heated to avoid premature condensation therein by the provision of heater coils 62 on at least the upper portion of tube 60, as shown in FIG. 2.

Condensation zone 70 comprises a tubular condenser 72 into which tube 60 extends for about one-half to two-thirds of the length of condenser 72. Heater coils 62, therefore, may be further extended, if desired, around the portion of tube 60 within condenser 72 as well, to further prevent condensation within tube 60.

Cooling coils 74, in contact with the outer surfaces of condenser 72, cool the incoming gases to vaporize the fullerene or fullerenes remaining in the gases. As shown in FIG. 2, cooling coils 74 may extend around the top, side and bottom outer surfaces of condenser 72. Cooling coils 74 maintain the temperature in condenser 72 within a range of from about 30° C. to about 100° C.

As shown in FIG. 2, a disc filter 78 may be placed adjacent the end 62 of tube 60 so that the gases flowing back through filter 78 to an exit port 76 in condenser 72 will not contain any condensed fullerenes. The gases leaving condenser 72 through exit port 76 then pass into pump 80 from which the gases may then either be vented to the atmosphere or advantageously recycled back to heated gas source 16 through pipe 82 shown in dotted lines in FIG. 3.

Condenser 72 may also be operated with a temperature gradient therein by extending the portion of condenser 72 below filter 78 and establishing a temperature gradient along this portion of the condenser wall ranging, for example, from 100° C. just below filter 78 down to −50° C. adjacent the bottom of condenser 72.

To provide for continuous operation of the process and apparatus of the invention, more than one condenser 72 may be provided in parallel with each connected to filter means 40 via a tube such as tube 60, but with a shutoff valve provided so that one condenser may be taken off line and product removed therefrom while the other condenser remains in operation.

To further illustrate the process and apparatus of the invention, $C_{60}$ and $C_{70}$ fullerenes were produced, collected, purified, condensed, and recovered by striking an arc in a 1 mm gap between two ¼" diameter graphite rods in a 20 liter evaporation chamber while flowing 10 sccm of helium gas through the chamber to sweep the soot containing the $C_{60}$ and $C_{70}$ fullerenes out of the chamber to deposit on a 1 micron filter. The soot containing the condensed fullerenes was taken out of the filter and placed at the first end of a quartz tube filled with glass Raschig rings and maintained at a temperature of about 700° C. at this first end. A temperature gradient was maintained in the tube extending from about 700° C. at this end to about 450° C. adjacent the opposite end of the tube.

Figure 1:
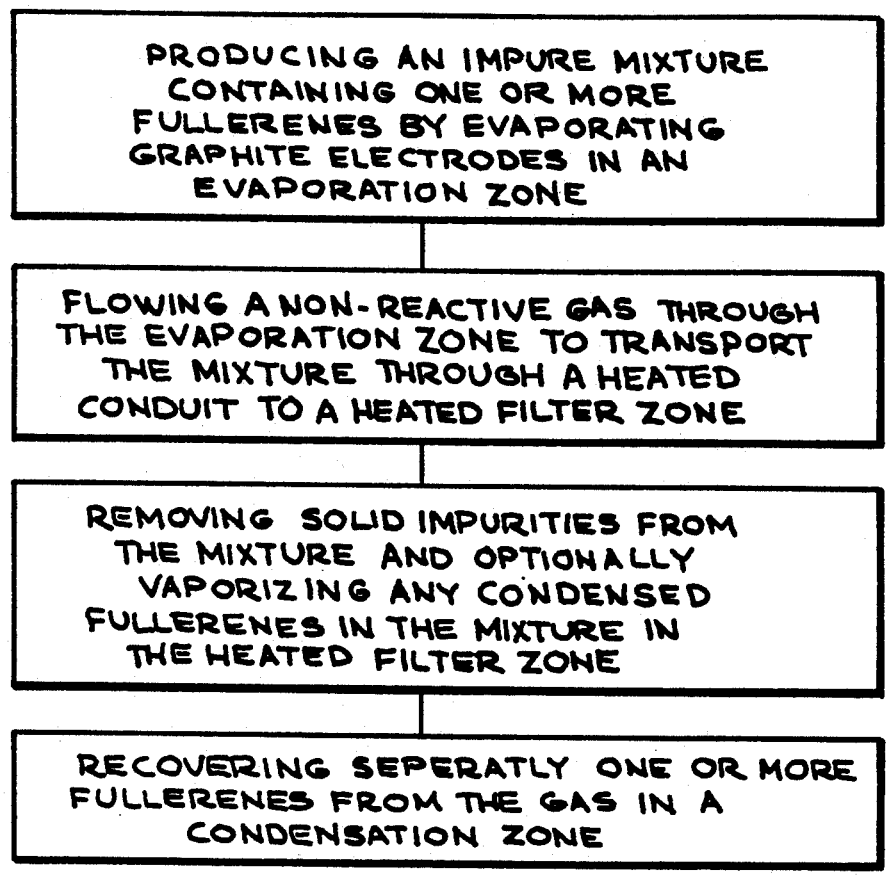
FIG. 1 is a flowsheet illustrating the process of the invention.
Figure 3:
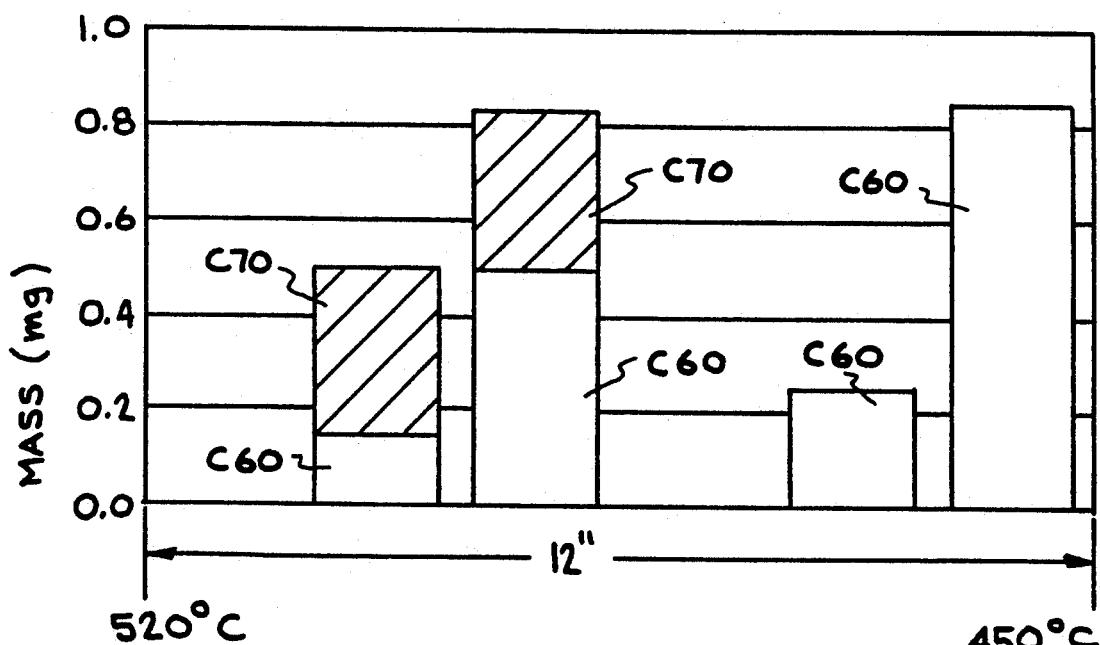
FIG. 3 is a graph showing the separation of $C_{60}$ and $C_{70}$ fullerenes in a temperature graded condensation zone.

The fullerenes in the soot were vaporized in the quartz tube and carried by a slow flow of hot helium gas to the cooler end of the tube where they condensed on the tube wall. Examination of the fullerenes condensed and collected in the low temperature end of the tube indicated that substantially pure $C_{60}$ had been recovered. The graph of FIG. 3 illustrates the makeup of the condensed fullerenes along the temperature gradient in the tube. It will be noted that mixtures of $C_{60}$ and $C_{70}$ fullerenes condensed and collected on the tube walls maintained at the higher temperature, while the fullerenes which condensed adjacent the lower portions of the tube maintained at the lower temperature consisted essentially of only $C_{60}$ fullerenes.

Thus, the invention provides a method and apparatus wherein an impure mixture of fullerenes may be produced by evaporation of graphite, collected in a gas, purified by filtration to remove solids, and the vaporized fullerenes then condensed and recovered from the gas. When it is desired to separately recover different molecular weight fullerenes, a temperature gradient may be used to permit separation and recovery of purified portions of different fullerenes.

Having thus described the invention what is claimed is:

1. A process for making fullerenes which comprises:
   a) producing an impure mixture containing one or more fullerenes in a first zone;
   b) collecting said impure mixture of fullerenes from said first zone by flowing a non-reactive gas through said first zone to vaporize any unvaporized fullerenes produced in step a);
   c) purifying said vaporized impure mixture of fullerenes by separating out solid impurities from said fullerenes in a separation zone; and
   d) recovering one or more of said purified fullerenes from said gas in a condensation zone.

2. The process of claim 1 including the further step of separating and separately recovering individual fullerenes from said gas.

3. The process of claim 1 wherein said step of producing said impure mixture containing one or more fullerenes in said first zone further comprises evaporating carbon in said first zone.

4. The process of claim 1 wherein said gas is preheated before being introduced into said first zone to a temperature sufficient to vaporize any fullerenes in condensed form in said first zone.

5. A process for producing fullerenes which comprises:
a) forming a mixture of soot and fullerenes by evaporation of a carbonaceous source in a first zone;
b) collecting said mixture by passing a heated flow of a non-reactive gas through said first zone to vaporize and/or entrain said mixture in said gas;
c) purifying said fullerenes in said heated gas by separating them from entrained soot in said gas in a filtering zone maintained at a temperature sufficiently high to vaporize any condensed fullerenes in said mixture; and
d) then recovering said fullerenes from said gas by condensation.

6. The process of claim 5 wherein individual fullerenes are produced by the further step of separating and recovering individual fullerenes from said gas by condensation of one or more fullerenes in a temperature graded zone.

7. The process of claim 6 wherein said nonreactive gas is selected from the group consisting of helium, neon, argon, krypton, xenon, and nitrogen.

8. The process of claim 5 wherein said nonreactive gas is preheated to a temperature of at least about 500° C. before passing through said first zone.

9. The process of claim 5 wherein said filtering zone is maintained at a temperature of at least about 700° C. to vaporize any condensed fullerenes in said non-reactive gas.

10. The process of claim 5 including the further step of separating and separately recovering individual fullerenes from said gas.

11. The process of claim 10 wherein said step of separating and recovering individual fullerenes from said gas further comprises passing said gas containing said vaporized fullerenes through a temperature graded condenser.

12. The process of claim 5 which further comprises maintaining said filtering zone at a temperature which will condense all fullerenes in said gas except $C_{60}$ fullerenes and then recovering said $C_{60}$ fullerenes from said gas by condensation in a condensation zone maintained at a temperature below the vaporization temperature of said $C_{60}$ fullerenes.

13. The process of claim 12 which further comprises recovering other fullerenes from said mixture by the steps of:
a) stopping said evaporation of said carbonaceous source in said first zone;
b) continuing to flow heated gas into said filtering zone;
c) raising the temperature in said filtering zone until one or more condensed fullerenes in said filtering zone vaporizes; and
d) recovering said one or more vaporized fullerenes from said gas by passing said gas containing said vaporized fullerenes through said condensation zone.

14. The process of claim 13 which further includes the step of separating and recovering individual fullerenes from said gas by passing said gas containing said vaporized fullerenes through a temperature graded filter to condense one or more fullerenes before said gas reaches said condensation zone.

15. The process of claim 13 which further includes the step of separating and recovering individual fullerenes from said gas by passing said gas containing said vaporized fullerenes through a temperature graded condenser in said condensation zone.

16. A process for producing fullerenes which comprises:
a) forming a mixture of soot and one or more fullerenes by evaporation of graphite in a first zone;
b) collecting said mixture by passing through said first zone a heated flow of a non-reactive gas selected from the group consisting of helium, neon, argon, krypton, xenon, and nitrogen to vaporize and/or entrain said mixture in said gas;
c) purifying said one or more fullerenes in said heated gas by separating them from said entrained soot in said gas in a filtering zone maintained at a temperature sufficiently high to vaporize and condensed fullerenes in said mixture; and
d) recovering said one or more vaporized fullerenes from said gas by passing said gas containing said one or more vaporized fullerenes through a temperature graded condensation zone.

17. Apparatus for making and recovering fullerenes which comprises:
a) means for producing an impure mixture containing one or more fullerenes in a first zone;
b) means for collecting said impure mixture of fullerenes from said first zone by flowing a non-reactive gas through said first zone;
c) filter means for purifying said impure mixture of fullerenes by separating out solid impurities from said fullerenes;
d) means for heating said filter means; and
e) means for recovering one or more of said purified fullerenes from said gas.

18. The apparatus of claim 17 wherein said means for producing an impure mixture containing one or more fullerenes in a first zone comprises carbonaceous rods spaced in an evaporation chamber.

19. The apparatus of claim 18 wherein said means for collecting said impure mixture of fullerenes from said first zone further comprises a source of non-reactive gas connected to said evaporation chamber to thereby flow said non-reactive gas through said evaporation chamber.

20. The apparatus of claim 17 wherein said heated filter means further comprise means for maintaining a temperature gradient in said filter means.

21. The apparatus of claim 18 wherein conduit means, with means for heating said conduit means, connect said evaporation chamber with said heated filter means.

22. The apparatus of claim 17 wherein said means for recovering said fullerenes from said gas further comprise condenser means.

23. The apparatus of claim 22 wherein said condenser means further comprise means for maintaining a temperature gradient in said condenser means.

24. The apparatus of claim 22 wherein a conduit means, with means for heating said conduit means, connects said filter means with said condenser means for recovering said fullerenes from said gas.

25. A process for making fullerenes which comprises:
a) producing an impure mixture containing one or more fullerenes in a first zone;
b) collecting said impure mixture of fullerenes from said first zone by flowing a non-reactive gas through said first zone to vaporize any condensed fullerenes in said impure mixture of fullerenes;

c) purifying said impure mixture of fullerenes by separating out solid impurities from said fullerenes by passing said mixture through filter means maintained at a temperature sufficiently high to vaporize any fullerenes not already vaporized to thereby purify said mixture by filtering out non-vaporized portions of said impure gas mixture; and d) recovering said fullerenes from said gas in a condensation zone.

26. The process of claim 25 wherein said step of separating and recovering individual fullerenes from said gas further comprises passing said gas containing said vaporized fullerenes through a temperature graded condensation zone.

27. A process for making fullerenes which comprise:
a) producing an impure mixture containing one or more fullerenes in a first zone;
b) collecting said impure mixture of fullerenes from said first zone by flowing a non-reactive gas through said first zone to vaporize any condensed fullerenes in said impure mixture of fullerenes;
c) purifying said impure mixture of fullerenes by separating out solid impurities from said fullerenes by passing said mixture through filter means maintained at a temperature sufficiently low to condense all of said fullerenes in said mixture except the lowest molecular weight fullerene in said mixture while permitting said lowest molecular weight vaporized fullerene to pass through said filter means for subsequent condensation and recovery in a condensation zone; and
d) recovering said vaporized fullerene from said gas in a condensation zone.

28. A process for making fullerenes which comprises:
a) producing an impure mixture containing one or more fullerenes in a first zone;
b) collecting said impure mixture of fullerenes from said first zone by flowing a non-reactive gas through said first zone to vaporize any condensed fullerenes in said impure mixture of fullerenes;
c) purifying said impure mixture of fullerenes by separating out solid impurities from said fullerenes by passing said mixture through filter means maintained at a temperature gradient to thereby condense one or more fullerenes in said filter means; and
d) recovering the remaining uncondensed fullerenes from said gas in a condensation zone.

29. A process for making fullerenes which comprises:
a) producing an impure mixture comprising one or more fullerenes and solid impurities in a first zone;
b) collecting and removing said impure mixture of fullerenes and solid impurities from said first zone by flowing anon-reactive carrier gas through said first zone to vaporize and/or entrain said mixture in said non-reactive gas;
c) vaporizing any unvaporized fullerenes in said impure mixture entrained in said non-reactive carrier gas;
d) purifying said impure mixture of fullerenes by separating out said solid impurities still entrained in said non-reactive carrier gas from said vaporized fullerenes in a separation zone; and
e) recovering one or more of said purified fullerenes from said non-reactive carrier gas in a condensation zone.

* * * * *